Dec. 3, 1968    F. A. SCHWERTZ ET AL    3,413,716
THIN-FILM INDUCTOR ELEMENTS
Filed April 30, 1965    2 Sheets-Sheet 2

INVENTORS
FREDERICK H. SMITH, JR.
FREDERICK A. SCHWERTZ
BY
ATTORNEYS

United States Patent Office 3,413,716
Patented Dec. 3, 1968

3,413,716
THIN-FILM INDUCTOR ELEMENTS
Frederick A. Schwertz, Pittsford, and Frederick H. Smith, Jr., Poughkeepsie, N.Y., assignors to Xerox Corporation, Rochester, N.Y., a corporation of New York
Filed Apr. 30, 1965, Ser. No. 452,288
5 Claims. (Cl. 29—602)

ABSTRACT OF THE DISCLOSURE

A method of producing a thin-film electrical inductor element in which a uniform conductive material is deposited on an insulating substrate, a xerographically formed pattern of chemical resist is placed on the conductive material in selected areas according to a predetermined spiral configuration, exposed areas of the conductive material are removed by subjection to a chemical etch to form a spiral conductor, the chemical resist material is removed to expose the conductive material in the predetermined spiral configuration, and an insulative magnetic core-forming material is deposited on the insulating substrate within the spiral of the conductor.

---

Figure 1:
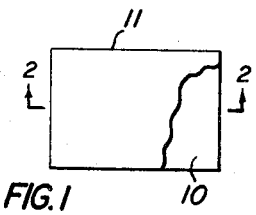

This invention relates to improvements in printed circuit techniques and particularly to the method of preparing thin film inductive elements for printed circuits and the like.

In recent years, a technical revolution has been occurring in electronics. In keeping with the growing need for complexity in electronic circuitry, techniques have been developed so that the fabrication of electronic circuit assemblies increasingly has been automated whereby the laborious hand assembly previously required has been substantially reduced. One technique which has contributed to this recent advance is the development of printed circuits wherein printed conductors or the like on a dielectric substrate connect the various passive circuit elements thereby eliminating the necessity of individual soldered wire connections.

Printed circuits and their fabrication have become well known and essentially consist of a dielectric substrate on which are formed electrical conducting lines. One means to produce these circuits is to coat the dielectric with a metallized surface which in turn is selectively coated in desired circuit areas with a protective material, commonly called "resist" so that the desired circuit areas are covered. The unprotected metal areas are then completely removed in a chemical etching bath after which the resist is removed to expose the circuit elements.

More recently, there has been discovered a process whereby both conductive lines and the resistive elements may be formed as integral parts of the printed circuit, thus eliminating the separate handling and soldering of the resistor components and providing a more compact finished product. This is accomplished by employing a dielectric substrate clad first with a layer of material having the desired order of resistivity to form resistive circuit elements over which is applied a layer of conductive material suitable for the conductive components to be formed. By selectively and successively etching the respective layers, the integral circuit components are formed.

With the growing change from tube circuits to transistor circuits, a new technique known as microminiaturization has led to the development of a module system of forming electric assemblies. This system has been pioneered by Diamond Ordnance Fuse Laboratories. In this system, a flat plate or substrate is processed to form the resistors, condensors and conductive lines, while the three-dimensional components, generally as packaged elements such as transistors, diodes, conductors, etc. are inserted to form the completed circuit. As the thin-film circuit elements are formed on the wafer itself, they are essentially two-dimensional circuit components. Thus, such circuits are generally termed "two-dimensional" or "2–D" circuits. Generally, 2–D circuits have been formed by evaporation processes, as by forming stencils corresponding to the separate circuit elements and successively evaporating the different compounds through the successive stencils thereby forming these precise circuit elements in the precise position desired on the substrate.

In the module technique of circuit miniaturization a wafer of uniform size is selected, as, for example, a dielectric substrate one inch by one inch or whatever size is deemed suitable. Substrate circuit components are first formed in the sections on the individual wafer. Complete circuits are then formed by combining the individual wafers which may be arranged and held parallel fixed, for example, by means of rigid end plates which may themselves contain sections of circuit components. Three dimensional elements are then usually attached to either the wafers or the end plates.

The prior art, therefore, has made significant advances in printed circuit technology including advances in the technique of circuit miniaturization. However, despite the advances in the art of microminiaturization, the art has been largely handicapped by the inability to produce inductor elements in thin-film formation.

Thus, inductive components have tended to be large and although considerable progress had been made in miniaturizing, the prior art has not as yet produced an inductive component that meets the size requirements of the microminiature circuit assembly. Hence, attempts by some laboratories to produce microminiature inductive components have not as yet met with success. Small inductor coils have been developed, for example, by the manufacturers of hearing aids and the like and although they represent an advance toward microminiaturization, they actually occupy such great volumes as to be inconsistent sizewise with the balance of the microminiature circuit assemblies.

The approach taken therefore in order to utilize optimum space has been to substitute R.C. circuits for inductive circuits wherever possible. In cases where coils have been printed, they require considerable surface area of the base plate and only a very limited range of values from about 0.1–1 microhenry can be achieved. Therefore, the fabrication of inductors has remained a major problem in designing integrated circuits. Within a limited volume, inductance can be raised only by increasing the number of turns in the cross-sectional area or improving the magnetic permeability of the surrounding medium.

Accordingly, it is an object of the invention to provide novel methods for producing thin-film inductor elements.

It is a further object of the invention to provide novel inductor elements produced in carrying out the method of the invention.

It is a still further object of the invention to provide thin film inductive elements having size compatibility in microminiature circuit assemblies.

The invention will be more clearly understood from the following description when read in conjunction with the accompanying drawings in which:

FIGS. 1–14 structurally illustrate in plan and cross section the sequential steps of a first embodiment for forming an inductor element in accordance herewith; and, FIGS. 15–24 structurally illustrate in plan and cross section the sequential steps of a second embodiment for forming an inductive element in accordance herewith.

Figure 3:
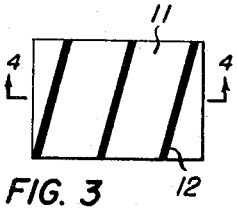
Figure 5:
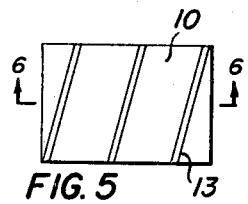
Figure 2:
Figure 4:
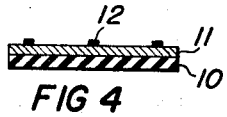
Figure 6:
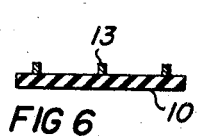

Referring now to FIGS. 1–6 the process of forming the inductive element is initiated as shown in FIGS. 1, 3 and 5 with FIGS. 2, 4 and 6 representing the respective cross sections thereof. Forming a base for the ultimate product is a substrate 10 supporting a uniform coextensive conductive overlayer 11. The substrate wafer preferably is a planar member of high dielectric properties and of high mechanical strength as, for example, of a phenol-formaldehyde laminae, ceramic material or the like and which may be shaped or specially formed to include tabs, holes, or slots, adapted for use in its ultimate assembly. Overlying the substrate and bonded thereto is the layer of conductive material such as copper, nickel, aluminum or the like deposited onto the substrate by vacuum evaporation or chemical dipping techniques as is known in the art. Thickness of the layer as will be understood, is a function of the immersion time and can be achieved by suitable controls utilized during the application thereof or by subsequent machining after an excessively thick layer has been applied.

Next, subsequent, the wafer member is subject to a series of stenciling and chemical etching steps, as for example, described in patent U.S. 3,061,911. The stenciling may be done xerographically, by means of silk screening or other suitable processes. Because of its high speed and versatility, xerographic stenciling is preferred, a technique for which is disclosed in patent U.S. 2,919,179. In accordance with the xerographic technique, the stenciling is accomplished by first exposing a charged photoconductive plate such as vitreous selenium to a graphic image of the desired circuit pattern. This results in a photoexact latent electrostatic image on the selenium surface and which can then be developed by cascading oppositely charged plastic powders over the selenium plate. The particles adhere to the plate only in the image areas to form a developed powder image which is then transferred electrostatically to the exposed surface of layer 11. The transferred image on layer 11 is then affixed thereto by exposing the wafer assembly to solvent vapors of a solvent of the plastic constituting the powder image. This then forms an image resist which will protect the underlying layer from chemical attack in the etching step which follows.

To produce the inductive article of the invention, a xerographic resist pattern 12 comprising a plurality of obliquely arranged disconnected parallel strips of up to about .05 and usually about .01 inch in width is applied to the surface of layer 11 as shown in FIGS. 1(c) and 1(d). With the resist pattern in place, the wafer is then processed to chemically etch away the unprotected areas of layer 11. After completing the etching, the resist 12 is removed and there is formed the configuration shown in FIGS. 5 and 6 in which a plurality of parallel conductive strips 13 corresponding to the resist pattern are adhering to the substrate 10. Where layer 11 comprises copper, etching can be effected by immersion in a solution of ferric chloride. Other chemical solutions for etching other layer compositions are well known in the art.

Figure 7:
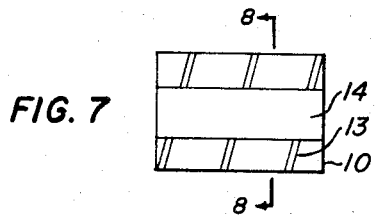
Figure 8:
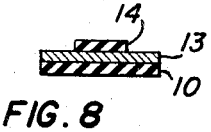

The structure thus far formed is then processed in accordance with the illustrations of FIGS. 7 and 8. By stenciling or masking an inductor core comprising a uniform layer 14 of insulating material such as magnesium oxide, silicon oxide or a ferrite such as magnesium iron ferrite, sodium ferrite or the like is deposited extending continuously transverse across the central portions of the conductive strips 13 as to leave the end portions thereof uncovered. As will be understood, the Q of the inductor to be formed will partially be a function of the effective permeability $u$ of the material of layer 14.

Figure 9:
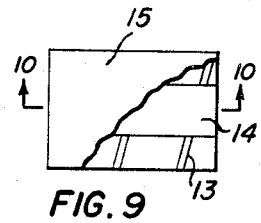
Figure 10:
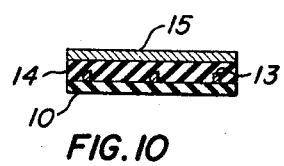

After application of core 14 the article is further processed in accordance with the illustrations of FIGS. 9–14. As shown in FIGS. 9 and 10, a uniform conductive layer 15, which may be the same as or different than layer 13 described above, is applied generally coextensive with substrate 10 as to uniformly cover layer 14 while also bonding to strips 13 and to substrate 10 in the interstices of the strips.

Figure 11:
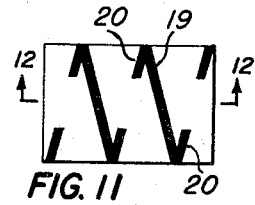
Figure 13:
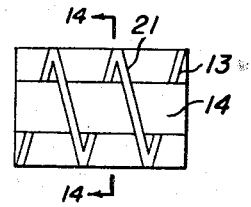
Figure 12:
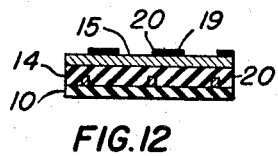
Figure 14:
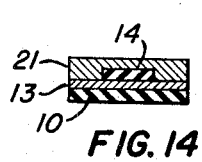

A xerographic pattern 19 is then placed on the top surface of layer 15 as shown in FIGS. 11 and 12 in the form of a plurality of spaced apart parallel strips arranged obliquely opposite to the direction of strips 13 to form an obtuse or acute angle relative thereto. At opposite ends of each of the patterns overlying the ends of strips 13 below, there is also formed as part of the pattern a tab 20. The tabs correspond to the end portions of strips 13 therebelow not covered by insulating layer 14 as to prevent its removal in the etching step to follow. With the resist pattern in place, the article is then similarly processed through an etching bath, to remove the portions of layer 15 uncovered by resist pattern 19 and tabs 20. On removing the resist pattern there is resolved the article illustrated in FIGS. 13 and 14, having topmost conductive strips 21 physically bonded to the lower conductive strips 13 and between which extends the continuous insulating or ferrite core 14.

The article thus formed constitutes a completed inductive thin film element having a continuous spiral formed between the continuous end-containing portions of strips 13 and 21 separated by central core 14. As can be appreciated, the inductive values thereof can be made to vary as a function of the radius of the coil, the number of turns, the thickness of the core, the permeability constant of the core and the like.

Figure 15:
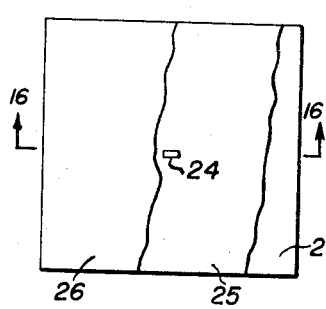
Figure 17:
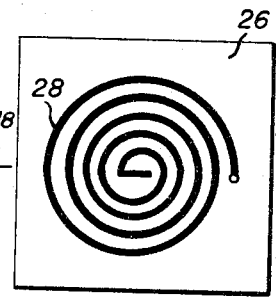
Figure 19:
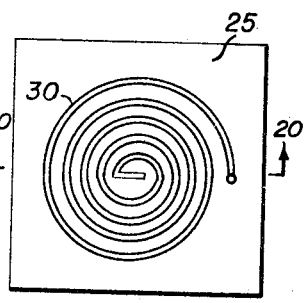
Figure 16:
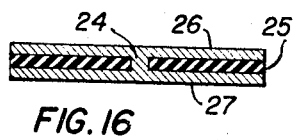
Figure 18:
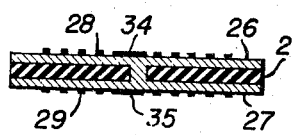
Figure 20:
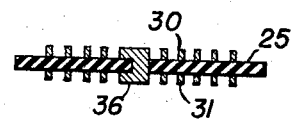

In FIGS. 15–24, there is disclosed a second embodiment for forming a thin film inductive element in accordance herewith. As shown in FIGS. 15 and 16, an insulating substrate 25, similar to substrate 10 above, is coated on opposite sides and through a preformed fine drilled opening 24 therein with uniform coextensive layers of conductive materials 26 and 27 such as copper. Xerographic resist patterns 28 and 29 in a spiral arrangement and a linear pattern 34 and 35 covering opening 24 are then placed simultaneously or sequentially onto the exposed surfaces of the conductive layers. The article bearing the resist image is then immersed in an appropriate etching solution which chemically attacks the uncovered portions of the conductive layers. On removing the resist, there is formed the articles shown in FIGS. 19 and 20 comprising the substrate 25 on which there is supported conductive pancake spirals 30 and 31 connected via conductor 36.

Figure 21:
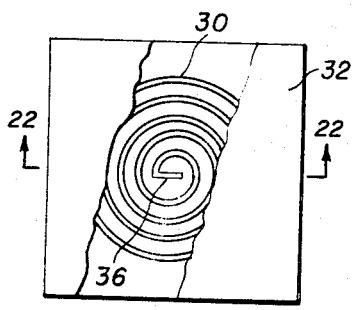
Figure 23:
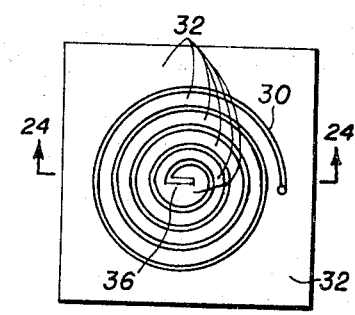
Figure 22:
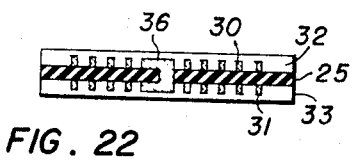
Figure 24:
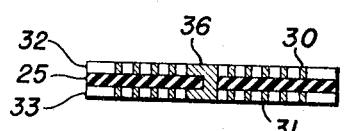

The spiral-bearing wafer is then subjected as shown in FIGS. 21 and 22 to vacuum evaporation or chemical dipping in order to apply insulating or ferrite layers 32 and 33 completely covering the conductive elements and filling the interstices of the spirals in contact with the substrate 25. By machining or etching the ferrite layers, the excess thereof above the surface level of the conductors is removed. This exposes the connected spiral conductors while leaving the interstices thereof packed with core material 32 and 33 forming the completed article illustrated in FIGS. 23 and 24.

With this latter embodiment the current is adapted to pass in series through the two spirals in such a direction that the north magnetic pole of the one spiral is vis-a-vis the south magnetic pole of the other spiral. This causes the magnetic flux lines to pass perpendicularly through the ferrite layer, thus magnetizing it and resulting in an inductor having a high Q value. By using ferrites having any appropriate effective permeability constant, it is possible to effect any proportional inductance value desired.

By the above description, there is disclosed novel means for forming thin film inductor articles. In accordance with the teachings hereof, it is possible to achieve any desirable inductance value by appropriate configuration of the different components and an appropriate selection of materials having the desired constants by which the inductance values can be controlled. With the inductor elements produced hereby any desired inductance value within a wide range can be produced. The product is relatively simple to produce and when completed can have an extremely thin cross sectional dimension. Such a result has not been possible by prior art techniques.

Since many changes could be made in the above construction any many apparently widely different embodiments of this invention could be made without departing from the scope thereof, it is intended that all matter contained in the drawings and specification shall be interpreted as illustrative and not in a limiting sense.

What is claimed is:

1. The method of producing a thin film electrical inductor element comprising, depositing a uniform conductive materal on at least one surface of a substantally flat insulating substrate, placing a pattern of chemical resist material on said conductive material in selected areas according to a predetermined spiral configuration, removing exposed areas of said conductive material by subjection to a chemical etch, removing said chemical resist material to expose said conductive material in the predetermined spiral configuration, and depositing an insulative magnetic core forming material on the insulating substrate within the spiral of the conductive material.

2. The method according to claim 1 wherein said chemical resist pattern is xerographically produced on said conductive material.

3. The method according to claim 2 wherein the uniform conductive material is deposited on opposite surfaces of said substrate in electrical conductive relationship.

4. The method of producing a thin film electrical inductor comprising the steps of:

depositing uniform conductive layers on opposite surfaces of a substantially flat insulating substrate and into an opening extending therethrough;

placing a pattern of acid resist material on each of said conductive layers, said patterns being arranged as spirals oppositely placed to each other with the said opening at the centers thereof and including a connecting portion extending from the inner end of each spiral to and over the area of the opening;

removing the exposed areas of said conductive layers by subjection to an acid etch;

removing said resist to expose corresponding spiral patterns of the material of said conductive layers electrically connected by the conductive material in said opening; and depositing insulative magnetic core-forming material in the interstices of said spirals.

5. The method according to claim 4 further including:

removing the excess of deposited insulative magnetic core-forming material extending above the surface level of said spirals.

References Cited

UNITED STATES PATENTS

| | | | |
|---|---|---|---|
| 2,584,592 | 2/1952 | Kehbel. | |
| 2,948,051 | 9/1960 | Eisler | 336—200 X |
| 3,080,541 | 3/1963 | Parker | 336—200 |
| 3,102,213 | 8/1963 | Bedson | 29—625 X |
| 3,185,947 | 5/1965 | Freymodsson | 29—625 X |

WILLIAM I. BROOKS, *Primary Examiner.*